United States Patent
Cherney et al.

[11] 3,968,848
[45] July 13, 1976

[54] DIGITAL WEIGHING APPARATUS

[75] Inventors: Dale M. Cherney, Howards Grove; Charles G. Hart; Richard W. Safranski, both of Sheboygan, all of Wis.

[73] Assignee: Hayssen Manufacturing Co., Sheboygan, Wis.

[22] Filed: July 28, 1975

[21] Appl. No.: 599,837

[52] U.S. Cl............................. 177/123; 177/DIG. 6; 177/46
[51] Int. Cl.².................. G01G 13/02; G01G 23/18
[58] Field of Search.............. 177/122, 123, DIG. 3, 177/DIG. 6, 46, 47

[56] References Cited
UNITED STATES PATENTS

| | | | |
|---|---|---|---|
| 3,189,110 | 6/1965 | Yarborough | 177/46 X |
| 3,254,728 | 6/1966 | Aquadro et al. | 177/122 X |
| 3,708,026 | 1/1973 | Senour | 177/122 X |
| 3,708,027 | 1/1973 | Hill | 177/DIG. 3 |
| 3,763,943 | 10/1973 | Bullivant | 177/123 X |
| 3,827,513 | 8/1974 | Epstein | 177/123 X |
| 3,856,097 | 12/1974 | Bartlo et al. | 177/123 X |

*Primary Examiner*—George H. Miller, Jr.
*Attorney, Agent, or Firm*—Koenig, Senniger, Powers and Leavitt

[57] ABSTRACT

Apparatus for feeding a product to a weighing scale and stopping the feed when the amount of product fed reaches a final weight. A scale having a balance portion to receive product to be weighed is movable from an initial position toward a balance position as product is delivered thereto. The balance portion of the scale starts to move upon delivery thereto of a predetermined initial weight of product. First and second product feeds are activated at the start of a weighing operation for delivering a quantity of product from a source thereof to the balance portion of the scale. The first feed delivers product at a first rate of speed and the second feed delivers product at a second and slower rate of speed. A sensor detects movement of the balance portion of the scale in either of two directions and provides first and second electrical outputs representative of the magnitude and direction of the movement thereof, each output always having one of two discrete states. Controls responsive to the sensor's outputs terminate operation of the first product feed when the amount of product delivered to the balance portion of the scale reaches a first predetermined level and terminate operation of the second product feed when the amount of product delivered to the balance portion of the scale reaches a second predetermined level substantially equal to the final weight of product to be delivered. The amount of product delivered to the balance portion of the scale after termination of operation of the second product feed brings the balance portion of the scale into its balance position indicating that the final weight of product to be delivered has been attained.

18 Claims, 6 Drawing Figures

DIGITAL WEIGHING APPARATUS

BACKGROUND OF THE INVENTION

This invention relates to systems for batch weighing a fluent product and more particularly to a digital control for such systems.

In the batch weighing of fluent products including granular, pelletized, and other products which tend to flow, an advantageous type of weighing is known as bulk and dribble weighing. This involves delivery of the product to a scale bucket or the like at two different delivery rates, i.e., a first rate called the bulk delivery weight and a second and reduced rate called the dribble delivery rate. Initially, feed at both the bulk and dribble delivery rates is initiated to fill the scale bucket relatively rapidly. Then, when a first weight of product has been delivered to the scale bucket, the bulk delivery is terminated and product is delivered at the slower or dribble rate until the final weight of product has been attained. The scale bucket is then dumped to deliver the batch of product for filling a bag or other container and the next weighing operation is commenced.

Various control systems have been devised for overseeing bulk and dribble feed operations. These systems typically employ either mechanical or electrical controls for terminating feed operations at appropriate points to insure both speed of operation and weighing accuracy. Mechanical control systems are disadvantageous because they require mechanical adjustments which are time consuming and require trial and error to insure proper settings; because they include pick-up weights which are often inaccessible and therefore difficult to adjust and head indicators which are so positioned as to be difficult to read; because feed cut-off points are confined to a relatively narrow range of weights; because no record of production weights are made; and because cleanup is difficult.

Electrical control systems have in the past been analog systems in which some type of sensor (e.g., a strain gage or differential transformer) provides an input to which the system responds. Such analog systems are disadvantageous because sensor outputs are affected by variations in input voltage, temperature and humidity, as well as by aging. Also, because the sensor output is usually a low level voltage, it has to be amplified to a level compatible with the control circuitry. This gives rise to weighing inaccuracies as a result of amplifier drift and creates the expense of including drift compensation circuits in the system. Further, the input provided by a sensor must be converted from an analog to a digital signal which requires circuitry to perform the conversion and which leads to weighing inaccuracies arising from the attempt to convert a value representative of a percent of full scale to an equivalent digital signal. Finally, as in mechanical systems most sensor's outputs also only cover a narrow range of weights.

SUMMARY OF THE INVENTION

Among the several objects of the present invention may be noted the provision of a digital weighing apparatus which electronically controls the weighing of repetitive batches of a fluent product; the provision of such apparatus which permits accurate batch weighing with precise digital control without the need to convert mechanical or analog indications representative of the amount of product delivered to a weighing apparatus to another signal form; the provision of such apparatus which requires no mechanical adjustments and whose operation is not influenced by temperature, humidity, aging or similar variables in maintaining weighing accuracy; the provision of such apparatus to be referrable to a fixed point during every weighing operation to eliminate weighing errors; the provision of such apparatus in which production weights are recorded for each weighing operation; the provision of such apparatus in which feed rates are controllable over a wide range of product delivery weights; and the provision of such apparatus which is simple in design, modular in construction, low in cost, high in reliability and easy to maintain.

Briefly, the apparatus of the present invention comprises a scale having balance means which receives product to be weighed and is movable from an initial position toward a balance position as product is delivered thereto, the balance means starting to move upon delivery thereto of a predetermined initial weight of product. First and second product feed means are activated at the start of a weighing operation for delivering a quantity of product from a source thereof to the balance means, the first means delivering product at a first rate of speed and the second means delivering product at a second and slower rate of speed. Sensing means detect movement of the balance means in either of two directions and provide first and second electrical outputs representative of the magnitude and direction of the movement thereof, each output always having one of two discrete states. Control means responsive to the outputs of the sensing means terminate operation of the first product feed means when the amount of product delivered to the balance means reaches a first predetermined level and terminate operation of the second product feed means when the amount of product delivered to the balance means reaches a second predetermined level substantially equal to the final weight of product to be delivered. The amount of product delivered to the balance means after termination of operation of the second product feed means brings the balance means into its balance position indicating that the final weight of product to be delivered has been attained.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
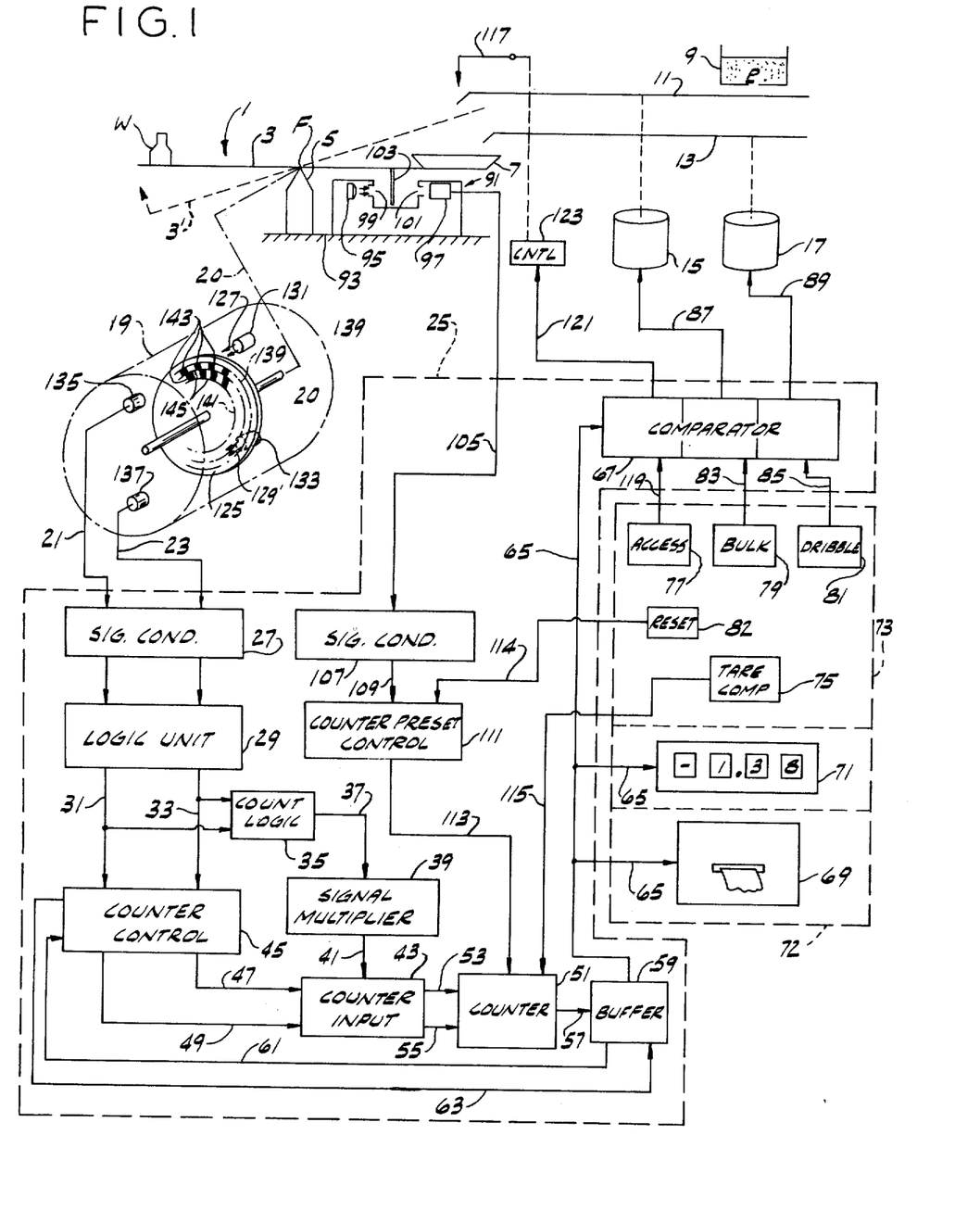
FIG. 1 is a block diagram of a digital weighing apparatus of the present invention.

Referring now to the drawings and more particularly to FIG. 1, a scale is generally indicated at 1 and includes a balance beam 3 whose fulcrum point F rests on a knife edge 5. On one end of beam 3 a weight W is placed which represents the total amount of a product P to be delivered to scale 1 during a weighing operation. At the other end of beam 3 is placed a bucket 7 or similar receptacle to receive a quantity of a fluent product to be weighed, the fluent product being, for example, a powder. At the start of a weighing operation, beam 3 is in an initial position represented by the dashed line 3', but after an initial predetermined weight of product has been delivered to bucket 7, beam 3 begins to move in the clockwise direction represented by the arrow from its initial position 3' to a balance position.

Product P is delivered to bucket 7 from a hopper 9 or similar source thereof by means of a first feed tray or conveyor 11 which will be referred to as the bulk feeder and by means of a second feed tray or conveyor 13 which will be referred to as the dribble feeder. Both bulk feeder 11 and dribble feeder 13 convey product P from hopper 9 to bucket 7 using vibratory motion, the vibratory motion for bulk and dribble feeders 11 and 13 being imparted by means of conventional vibratory units 15 and 17, respectively. The product flow rate of feeders 11 and 13 depend upon the degree of vibratory motion imparted by units 15 and 17 respectively, and it will be understood that bulk feeder 11 and its associated vibratory unit 15 deliver product P at a first rate of speed, while the dribble feeder 13 and its associated vibratory unit 17 deliver product P at a second and slower rate of speed.

A sensing unit or shaft encoder 19 is mechanically linked to balance beam 3, this coupling being represented by the dashed line 20. Unit 19 senses movement of beam 3 in either of two directions (i.e., movement toward a balance position or movement away from a balance position) and provides a first electrical output on line 21 and a second electrical output on line 23, these outputs being representative of the magnitude and direction of balance beam 3 movement. Each output is always in one of two discrete states as will be discussed hereinafter.

The first and second electrical outputs of sensing unit 19 are supplied as inputs to a control unit 25. Control unit 25 includes a first signal conditioner 27 for filtering out noise and for transforming the levels of the discrete states entering control unit 25 on lines 21 and 23 to levels compatible with a logic unit 29. Logic unit 29 processes the inputs to control unit 25 from sensing unit 19 and determines from them the direction and extent of movement of balance beam 3 in a manner to be discussed. Logic unit 29 supplies a first signal on line 31 representative of the distance the balance beam 3 moves in a first direction (i.e., toward a balance position) and a second signal on line 33 representative of the distance balance beam 3 moves in a second direction (i.e., away from a balance position). A count logic circuit 35 responds to these first and second signals to supply a signal element on line 37 to a signal multiplier 39 each time balance beam 3 moves an incremental distance in either direction. Signal multiplier 39 is responsive to each signal element supplied thereto to double the repetition rate thereof and supply two signal elements on line 41 to a counter input 43. The first and second signals on lines 31 and 33 respectively are also inputs to a counter control 45 whose function is to supply a signal on either line 47 or 49 to counter input 43 to have counter input 43 supply the signal elements received from signal multiplier 39 to one of two inputs of a counter 51 to increment or decrement the contents thereof.

Counter 51 is a reversible presettable counter that counts from a first predetermined value representative of the initial weight of product to be delivered to bucket 7 of balance beam 3 before balance beam 3 begins to move from its initial position 3', to and past a second predetermined value representative of the final weight of product to be delivered to bucket 7 of balance beam 3. Counter 51 is a conventional three decade counter whose count range is equivalent to six ounces, for example. If, for example, balance beam 3 does not move from position 3' until the final product weight less 5 ounces has been delivered to bucket 7, then counter 51 has a maximum underweight setting of −5.00 and counts down from −5.00 to zero (which represents the final weight of the product to be delivered to bucket 7) and can count up from zero to +1.00. The reason counter 51 can up count to a positive value is because product P, if it has any appreciable bulk, may cause balance beam 3 to move past its balance position when product P falls into bucket 7 and then swing back to a position not quite its balance position. By making counter 51 responsive to this action, better control over product feed and weighing accuracy can be achieved than if the upper limit of the counter 51 value were zero. The inputs causing counter 51 to down count or up count the value of its contents are the signal elements supplied by signal multiplier 39 through the counter input 43. The output of counter input 43 on line 53 goes to the up-count input of counter 51 while the output of counter input 43 on line 55 goes to the down-count input.

The contents of counter 51 are supplied on line 57 to a buffer 59. One output of buffer 59 is supplied on line 61 to counter control 45. This output is a logic level derived from the counter contents and is used by counter control 45 in determining whether the signal elements supplied to counter input 43 are to be provided to the up-count or down-count input of counter 51. Counter control 45 supplies an output on line 63 to buffer 59. This output establishes whether the value of the counter 59 contents in buffer 59 are to be interpreted as a plus or a minus value.

The output of buffer 59 is supplied on line 65 to a comparator 67 and to a printer 69, which supplies a digital printout of the counter 51 contents, located in a display panel 72. A control 73 includes a tare compensation control 75, an accessory control 77, a bulk control 79, a dribble control 81 and a reset pushbutton 82. Tare compensation control 75 is comprised of two thumbwheel switches while the accessory, bulk and dribble controls 77, 79 and 81, respectively, are each comprised of three thumbwheel switches.

Prior to initiating a weighing operation, the thumbwheel switches of the bulk control 79 and the dribble control 81 are each set to a preselected number. The setting of bulk control 79 is entered into comparator 67 on line 83 and becomes a first preselected count against which the value of the counter 51 contents is compared. The setting of the dribble control 81 is entered into comparator 67 on line 85 and becomes a second preselected count against which the value of the counter 51 contents is compared. During a weighing operation, when the value of the counter 51 contents equal the first preselected count, an output is supplied by comparator 67 on line 87 to terminate operation of vibratory unit 15. This stops the bulk feed of product P to bucket 7. When the value of the counter 51 contents equals the second preselected count, an output is supplied by comparator 67 on line 89 to terminate operation of vibratory unit 17. This stops the dribble feed of product P to bucket 7. This second preselected count, at which the dribble feed is terminated, is chosen to be a value substantially equal to the final weight of product P to be delivered to bucket 7 of balance beam 3. This is done so that when dribble feed is terminated the amount of product P is suspension between dribble feeder 13 and bucket 7 will be sufficient to bring balance beam 3 into a balance position indicating that the final weight of product P to be delivered has been attained.

Other components of the apparatus shown in FIG. 1 include an optical position sensing unit 91 which is affixed to a portion 93 of the scale frame and whose function is to provide an indication when balance beam 3 has moved to an intermediate position between its initial position 3' and its balance position. Optical sensing unit 91 also includes a light source 95 and a light detector 97. Light source 95 beams a ray of light at light detector 97, the ray of light passing through a first aperture 99 and a second aperture 101 in unit 91. Apertures 99 and 101 are very small, e.g., one-sixty-fourth of an inch in diameter, so that the attainment of the intermediate position by balance beam 3 may be accurately determined. When balance beam 3 reaches its intermediate position this is indicated by a tab 103, (affixed to the underside of balance beam 3 and extending downwardly therefrom) interrupting the passage of light between light source 95 and detector 97. When this occurs, the logic level output of detector 97 changes from one logic state to another and this change is supplied as an output on line 105 to a second signal conditioner 107 of control unit 25. Signal conditioner 107 functions similarly to signal conditioner 27 and supplies an output on line 109 to a counter preset control 111. Counter preset control 111 responds to the input from optical sensing unit 91 to supply a preset command on line 113 to counter 51. Counter 51 is responsive to this preset command to change the present value of its contents to a preset value which is representative to the weight of product P delivered to bucket 7 when balance beam 3 attains its intermediate position, the preset value, for example, being −1.00. Since a preset command is provided counter 51 during each weighing operation, any counts counter 51 may have lost or gained during a weighing operation are corrected for. This results in the maximum production error in a series of weighing operations being limited to one product delivery.

Tare compensation control 75 on control panel 73 is used to provide an input on line 115 to counter 51. The purpose of this control function is to load an input into counter 51 to adjust the value of the contents thereof to compensate for adherence to bucket 7 of any product P delivered to bucket 7 during prior weighing operations. This product adherence or "bucket buildup" causes weighing inaccuracies because as more and more product P sticks to bucket 7, less and less product P has to be delivered to balance beam 3 before it indicates that the final weight of product P has been attained. In a long term production run this means that later packages of product P are increasingly underweight. Post-weighing inspections, such as checkweighing, can determine the extent of bucket buildup, if any. Thus, for example, if check weighing reveals that packages are 0.5 oz. under weight, tare compensation control 75 can be set to 0.5. Then when the next preset command is supplied to counter 51 on line 113, the value of the counter 51 contents has adjusted by an amount which will require the delivery of an additional 0.5 oz. of product P to bucket 7 before an indication is given that the final weight of product has been attained or, in this example, to −1.50.

Reset pushbutton 82 on panel 73 supplies an input on line 114 to counter preset control 111 whenever it is depressed, which is usually at the start of the first of a series of weighing operations. This input causes counter preset control 111 to supply an input on line 113 to set the value of the counter 51 contents to the value representative of the initial weight of product to be delivered to bucket 7 before balance beam 3 moves from its initial position 3'.

The accessory control 77 is provided on control panel 73 to perform any of a number of auxiliary control functions, for example, the control of a brush bar 117. Brush bar 117 is movable from an initial position in the counterclockwise direction indicated by the arrow, into a position to prevent further delivery of product P by bulk feeder 11 upon termination of bulk feed. This action prevents the possibility of any product P hanging on the lip of bulk feeder 11 and later dropping into bucket 7 thereby possibly resulting in an overweight package. Thus, the thumbwheel switches of accessory control 77 are set to a preselected number which is entered into comparator 67 on line 119 and becomes a third preselected count against which the value of the counter 51 contents are compared. When the value of the counter 51 contents equal this third preselected count, an output is supplied by comparator 67 on line 121 to a brush bar control 123 which activates control 123 to move brush bar 117 into a product blocking position.

To better understand the operation of the apparatus of the present invention assume that in a weighing operation the following conditions exist. First, sixteen ounces of a fluent product P are to be weighed; second, balance beam 3 does not move from its initial position 3' until eleven ounces of product P are delivered to bucket 7; third, product P is to be delivered to bucket 7 by both bulk and dribble feed until fourteen ounces of product have been delivered at which point bulk feed is to be terminated; fourth, if dribble feed is terminated after fifteen and one-half ounces of product P have been delivered to bucket 7, the amount of product in suspension between dribble feeder 13 and bucket 7 at the time of termination will be one-half ounce; and fifth, counter 51 is adapted to count, as before, from −5.00 to +1.00 with a zero count indicating that 16 ounces of product P have been delivered to bucket 7.

For these conditions, a scale operator places a weight W equal to 16 ounces on the end of balance beam 3 opposite bucket 7. Next the operator sets the thumbwheel switches of the bulk control 79 and the dribble control 81 on control panel 73 to −2.00 and −0.50 respectively. The operator then depresses the reset pushbutton 82 on control and display panel 75 which sets the value of the Counter 51 contents at −5.00 and initiates a weighing operation.

Product P falls out the bottom of hopper 9 onto bulk feeder 11 and dribble feeder 13 and by means of the vibratory motion imparted to these conveyors by vibratory units 15 and 17 respectively, moves along each. As noted, product P will move less rapidly along dribble feeder 13 since feeder 13 delivers product at a rate slower than that of bulk feeder 11. When product P reaches the end of each feeder it falls off the end thereof into the bucket 7 positioned to receive it. Balance beam 3 remains in its initial position 3' until 11 ounces of product P are delivered by bulk feeder 11 and dribble feeder 13 to bucket 7.

When 11 ounces of product P have been delivered, balance beam 3 begins to move from its initial position 3' clockwise in the direction of the arrow toward its balance position. This movement acutates sensing unit or shaft encoder 19, such shaft encoder being commercially available from The Renco Corporation under its trade designation "Model 2500T". Unit 19 now begins to supply first and second electrical outputs on lines 21 and 23 respectively. As shown in FIG. 1, an optically encoded disk 125 is mechanically coupled to the balance beam 3 as indicated by dashed line 20. Disk 125 is interposed along optical paths as indicated at 127 and 129 between light sources 131 and 133 and light detectors 135 and 137 to transmit or block the passage of light therebetween. The output of light detector 135 or 137 is one logic level or discrete state when light passes between a light source and its associated detector and is a second logic level or discrete state when light passage between a light source and its associated detector is blocked by disk 125.

Figure 4:
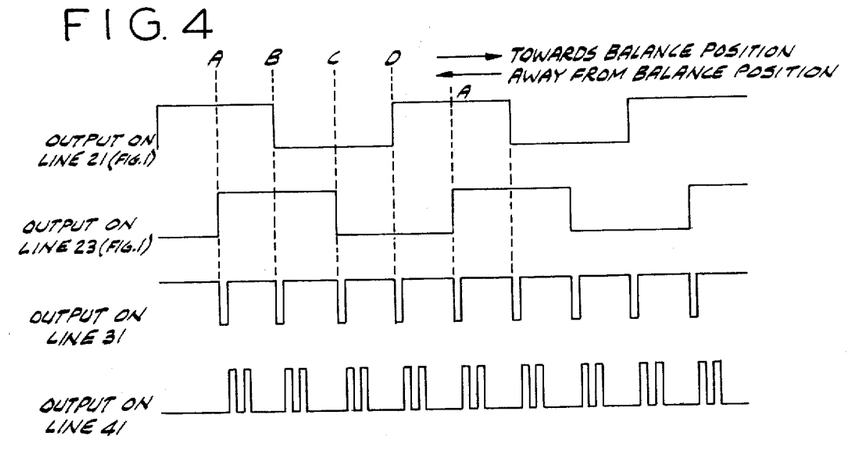
FIG. 4 illustrates waveforms at various points in the control portion of the apparatus to aid in understanding its operation.

As shown, disk 125 has two concentric optically encoded bands 139 and 141 each of which has alternating opaque and light transmitting zones 143 and 145 respectively. Further, the opaque and light transmitting zones of the outer concentric ring 139 are shifted with respect to those of inner concentric ring 141. This phase shiift is equivalent to 90 electrical degrees for reasons to be discussed. Light source 131 and light detector 135 are aligned so that passage of light between them is controlled by the zones of outer concentric ring 139 thus for light detector 135 to alternately supply the first and second discrete states of the first electrical output of sensing unit 19 in a first sequence. Similarly, light source 133 and light detector 137 are aligned so that passage of light between them is controlled by the zones of the inner concentric ring 141 thus for light detector 137 to alternately supply the first and second discrete states of the second electrical output in a second sequence. Referring to FIG. 4, it can be seen that the first electrical output of sensing unit 19 on line 21 is shifted in phase with respect to the second electrical output on line 23. This phase relationship between the first and second electrical outputs of sensing unit 19 is a function of the direction of balance beam 3 movement as can be seen by referring to the direction arrows in FIG. 4. Further, because of the extent of movement of balance beam 3 depends upon the amount of product delivered to the bucket 7 thereon, the magniture of balance beam 3 movement is directly related to the amount of product delivered thereto. Sensing unit 19 thus provides two outputs from which the amount of product delivered to bucket 7 can be determined.

Figure 2:
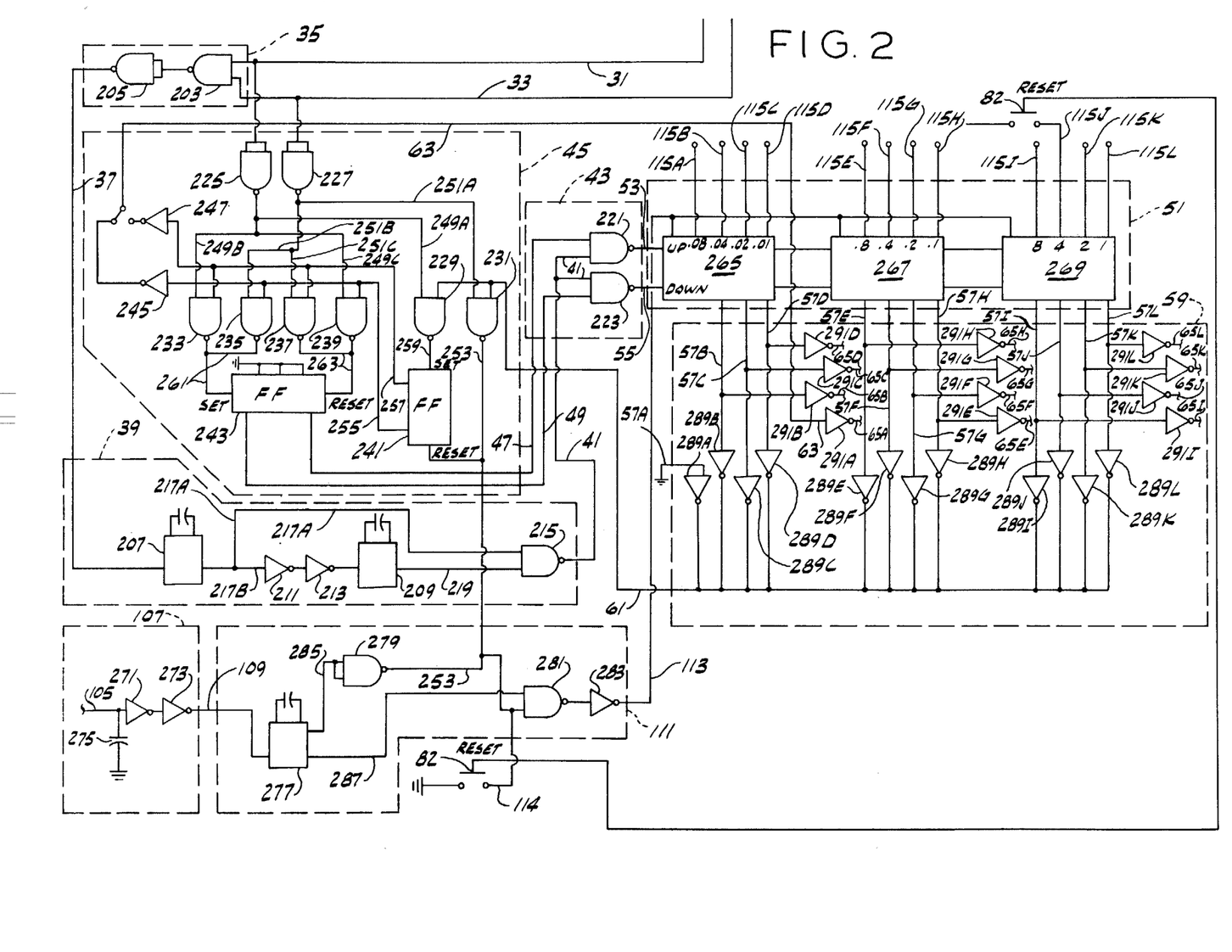
FIGS. 2 and 2A and FIGS. 3 and 3A are schematics of the control portion of the apparatus of FIG. 1.
Figure 2A:
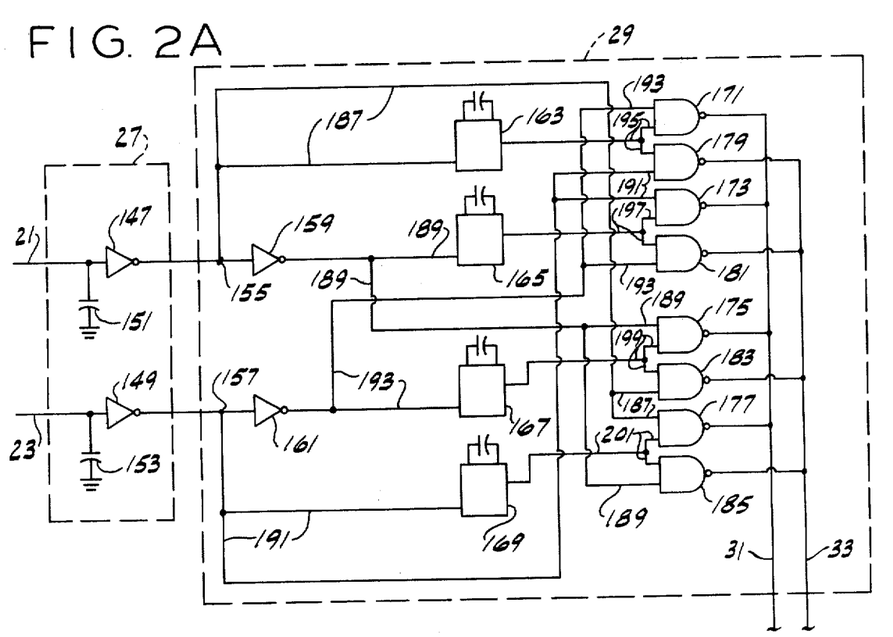

Referring now to FIGS. 2 and 2A, a first schematic portion of control unit 25 is shown. Included in FIG. 2 are the first signal conditioner 27, logic unit 29, count logic 35, signal multiplier 39, counter input 43, counter control 45, counter 51, buffer 59, the second signal conditioner 107, counter preset control 111, and reset pushbutton 82 on control and display panel 73.

The inverters 147 and 149 of signal conditioner 27 provide isolation between sensing unit 19 and logic unit 29 while capacitors 151 and 153 are noise filters. The output of inverter 147, (the first electrical output of sensing unit 19) is supplied to a junction 155 at the input of logic unit 29, while the output of inverter 149 (the second electrical output of sensing unit 19) is supplied to a junction 157 at the input of logic unit 29. Logic unit 29 is responsive to the first and second electrical outputs of sensing unit 19 to sense the transition of either output between one discrete state thereof and the other discrete state thereof, to determine the direction of transition between discrete states (logic low to logic high or vice versa), to compare the direction of transition between discrete states of the one electrical output with the discrete state of the other electrical output at the time of transition, and to supply one element of the first signal on line 31 when the direction of transition between discrete states of the one electrical output compared with the discrete state of the other electrical output indicates that balance beam 3 has moved an incremental distance (which, in this example, is equivalent to the delivery of 0.02 oz. of product to bucket 7) toward its balance position, and to supply one element of the second signal on line 33 when the direction of transition between discrete states of the one electrical output compared with the discrete state of the other electrical output indicates that balance beam 3 has moved and incremental distance away from its balance position.

Logic unit 29 includes two inverters 159 and 161, one-shot multivibrators 163, 165, 167 and 169, and eight NAND gates, four of which (171, 173, 175 and 177) supply outputs to line 31, and four of which (179, 181, 183 and 185) supply outputs to line 33. The input to logic unit 29 at junction 155 is supplied on line 187 to one input of NAND gates 177 and 183, as well as to the input of one-shot multivibrator 163. Further, the input logic level at junction 155 is inverted by inverter 159 with the output thereof supplied on line 189 to one input of NAND gates 175 and 185 and to the input of multivibrator 165. The input to logic unit 29 at junction 157 is supplied on line 191 to one input of NAND gates 173 and 179 and to the input of multivibrator 169. Further, this input logic level at junction 157 is inverted by inverter 161 with the output thereof supplied on line 193 to one input of NAND gates 171 and 181 and to the input of multivibrator 167. The output of multivibrator 163 is supplied on line 195 to the other input of NAND gates 171 and 179, while the output of multivibrator 165 is supplied on line 197 to the other input of NAND gates 173 and 181. The output of multivibrator 167 is supplied on line 199 to the other input of NAND gates 175 and 183, while the output of multivibrator 169 is supplied on line 201 to the other input of NAND gates 177 and 185.

To understand the operation of logic unit 29, reference should be made to the dashed line A in FIG. 4 which for movement of balance beam 3 toward its balance position indicates the point at which there is a transition between discrete states of the second electrical output of sensing unit 19 on line 23 (i.e., a transition from a logic low to a logic high) while the discrete state of the first electrical output of sensing unit 19 on line 21 remains unchanged (i.e., a logic high). Assuming that balance beam 3 is moving toward a balance position, just prior to the transition between discrete states of the second electrical output, the input on line 21 to signal conditioner 27 is a logic high with the resultant logic level at junction 155 low. This means that the input on line 187 to NAND gates 177 and 183 and multivibrator 163 is low. The output of multivibrator 163, with a low input, is low, and this makes the input on line 195 to NAND gates 171 and 179 low. The output of inverter 159 is high so that the input on line 189 to NAND gates 175 and 185 is high. The input on line 189 to multivibrator 165 is high, however, multivibrators 163, 165, 167 and 169 normally supply a logic low output to the NAND gates and supply a logic high output of a short duration (e.g. 20 microseconds) thereto only when there is a transition at the multivibrator input from a logic low to a logic high. Accordingly, the output of multivibrator 165 on line 197 to the input of NAND gates 173 and 181 is low.

At the same moment, the input on line 23 to signal conditioner 27 is a logic low with the resultant logic level at point 157 high. This means that the input on line 191 to NAND gates 173 and 179 is high as is the input to multivibrator 169. The output of multivibrator 169 is low for reasons previously discussed thus making the input on line 201 to NAND gates 177 and 185 low. Finally, the output of inverter 161 is low which makes the input on line 193 to NAND gates 171 and 181 and to multivibrator 167 low. The output of multivibrator 167 on line 199 to the input of NAND gates 175 and 183 is low.

This results in NAND gates 171, 177, 181 and 183 having two low inputs while NAND gates 173, 175, 179 and 185 have a high and low input. Since a NAND gate has a high output unless both inputs are high, all eight NAND gates supply a logic high output to lines 31 and 33 at this time.

When the transition between discrete states of the second electrical output of sensing unit 19 on line 23 occurs at the point A denoted in FIG. 4, the output of sensing unit 19 on line 21 is a logic level high as before. Therefore, the input to NAND gates 177 and 183 on line 187 remains low, the input to NAND gates 175 and 185 on line 189 remains high, the input to NAND gates 171 and 179 on line 195 remains low and the input to NAND gates 173 and 181 on line 197 remains low.

At the moment of transition, the input to inverter 149 of signal conditioner 27 on line 23 goes from a logic low to a logic high, changing the logic level at junction 157 of logic unit 29 from high to low. This makes the input on line 191 to NAND gates 173 and 179 and to multivibrator 169 low. The output of multivibrator 169 remains low on line 201 to the input of NAND gates 177 and 185.

The transition from high to low at junction 157 is inverted by inverter 161 to become a low to high transition to the input of multivibrator 167. This is the transition the multivibrators in logic unit 29 respond to, and consequently, the output of multivibrator 167 goes momentarily high. This provides a logic high on line 199 to the input of NAND gates 175 and 183. The other input to NAND gate 183 on line 187 is low, thus keeping the output of NAND gate 183 high. However, the other input to NAND gate 175 on line 189 is high and therefore the output of NANd gate 175 goes low for the period of the multivibrator 167 response to the transition between discrete states of the second electrical output of sensing unit 19. As a result, an element of the first signal is supplied to line 31 by NAND gate 175, which, as noted, is the logic unit 29 output for the signal indicating balance beam 3 movement toward a balance position.

NAND gates 171, 173, 175 and 177 are arranged in a "wired or" configuration; that is, when the output of any gate goes low, the output of all go low because line 31 is common to the output of each. Gates 179, 181, 183 and 185 are similarly wired with respect to line 33.

Referring to FIG. 4, it will be seen that one element of the first signal is supplied on line 31 by logic unit 29 whenever a transition between discrete states occurs to either electrical output of sensing unit 19, provided balance beam 3 is moving toward a balance position. Were balance beam 3 movement away from a balance position an element of the second signal would be supplied on line 33 at each transition. For the movement toward a balance position as used in this example, the element of the first signal on line 31 at point B is supplied by NAND gate 171, that at point C is supplied by NAND gate 177, and that at point D is supplied by NAND gate 173. It can be seen that this constitutes four separate responses within control unit 25 to the movement of balance beam 3 a distance represented by one complete sequence of transitions of the discrete states for both the first and second electrical outputs of sensing unit 19 so that the rate at which control unit 25 responds to the sensing unit 19 outputs is multiplied by four.

Count logic 35 is comprised by two NAND gates 203 and 205, the output of gate 203 supplying the input to gate 205. When no signal element is supplied by logic unit 29 on either line 31 or 33, both inputs to NAND gate 203 are high which makes the output of gate 203 to the input of gate 205 low and its output high. When an element of either the first or second signal is supplied by logic unit 29 on line 31 or 33 respectively, one input to NAND gate 203 goes low for the period of duration of the signal element. This makes the inputs to NAND gate 203 high and low which changes the gate 203 output from low to high. With the inputs to gate 205 high, the output thereof goes low until the signal element at the input to gate 203 terminates, at which time the output reverts back to a logic high. Thus count logic 35 responds in a similar manner to a signal element of either the first or second signal from logic unit 29 to provide an output indicative of the movement of balance beam 3 an incremental distance in either direction.

Signal multiplier 39 includes two one-shot multivibrators 207 and 209, two inverters 211 and 213 and a NAND gate 215. Multivibrators 207 and 209 respond in the same way as multivibrators 163, 165, 167 and 169 of logic unit 29 except that the output of multivibrators 207 and 209 is normally high. When the output of count logic 35 on line 37 goes from a logic low to a logic high, which occurs at the end of the signal element supplied by logic unit 29 to count logic 35, the transition triggers multivibrator 207. This delay until the end of the signal element insures the count direction will be set during the signal element and prior to entering the count into the counter. The output of multivibrator 207 goes low for a short duration (i.e., 20 microseconds) and this output is supplied on line 217A to one input of NAND gate 215 and on line 217B to the input of inverter 211. Normally, the inputs to NAND gate 215 are both high so that its output on line 41 is low. When, however, the input on line 217A to NAND gate 215 goes low, the output of gate 215 goes high for the duration of the multivibrator 207 low output.

Inverters 211 and 213 serve as time delays. When the output of multivibrator 207 returns from its logic low to its normally high output level, this transition is supplied on line 217B through inverters 211 and 213 to trigger multivibrator 209. The output of multivibrator 209 then goes low on line 219 for the same duration as that of the output of multivibrator 207 and is supplied to the input of NAND gate 215. By the time multivibrator 209 is triggered and supplies a low input to NAND gate 215, the low input supplied to gate 215 by multivibrator 207 has terminated and the input to gate 215 on line 217A is again high. NAND gate 215 thus sees the output of multivibrator 209 as a second signal element supplied by logic unit 29 and responds by supplying a second high on line 41 displaced in time from that resulting from the input supplied by multivibrator 207. The output of signal multiplier 39 in response to a signal element supplied by logic unit 29 is shown in FIG. 4 and indicates that signal multiplier 39 has doubled the repetition rate of signal elements supplied by logic unit 29.

It should be noted that each incremental movement of balance beam 3 toward a balance position, which represents the delivery to bucket 7 of an incremental amount of product, has now resulted in the production by logic unit 29 of control unit 25 of one element of the first signal. This element has been multiplied to produce two signal elements which are supplied on line 41 to counter input 43. For a counter 51 to be used in control unit 25, these two signal elements are used to change the value of the contents of counter 51 by two-hundredths of an ounce so that the resolution of counter 51 is 0.02 instead of 0.01. It is to be understood that a counter 51 resolution of 0.01 can be obtained by disconnecting the output of multivibrator 209 from the input to NAND gate 215 and by connecting the output of multivibrator 207 on line 217A to both inputs of NAND gate 215.

Counter input 43 is comprised by two NAND gates 221 and 223, each having one input supplied by signal multiplier 39 on line 41. The other input to NAND gate 221 is supplied on line 47 from counter control 45, while the other input to NAND gate 223 is supplied on line 49 from counter control 45. The output of NAND gate 221 on line 53 supplies the upcount input to counter 51, while the output of NAND gate 223 on line 55 supplies the downcount input to counter 51. The output of counter control 45 to counter input 43 is determined by whether an element of the first or second signal is supplied to counter control 45 by logic unit 29 and by the present value of the contents of counter 51.

Counter control 45 includes NAND gates 225, 227, 229, 231, 233, 235, 237 and 239, flip-flops 241 and 243, and inverters 245 and 247. In the present example, with the output of logic unit 29 being a signal element supplied on line 31, the inputs to NAND gate 225 are low for the period in which a signal element is supplied and the output of gate 225 during this period is high on lines 249A, 249B and 249C, to one input of gates 229, 233 and 239 respectively. The inputs of NAND gate 227 are both high at this time, and its output is low on lines 251A, 251B and 251C to one input of gates 231, 235 and 237 respectively. The other input to counter control 45 is a logic level supplied on line 61 from buffer 59 and this is supplied to one input of NAND gates 229 and 231. If the value of theh contents of counter 51 is not equal to zero, the logic level of the input on line 61 is low. When the value of the contents of counter 51 reach zero, this logic level changes to a high and it remains high so long as the counter 51 contents are zero.

At the start of the weighing operation when the operator depressed reset pushbutton 82 on control panel 73 a logic low was supplied on line 253 to the reset input of flip-flop 241. This logic level reset flip-flop 241 so that its output on line 255 is high, while its output on line 257 is low. This occurs within the chip itself and as a result logic levels to the inputs to force a set or reset may vary. In our case, a logic low to either input will force a set or reset. The output of flip-flop 241 on line 255 is supplied to one input of NAND gates 235 and 239 and to the input of inverter 245, while the output of flip-flop 241 on line 257 is supplied to one input of NAND gates 233 and 237 and to the input of inverter 247.

Assuming that the value of the contents of counter 51 is less than zero when a signal element is supplied by logic unit 29 on line 31 to the input of NAND gate 225, the input supplied to NAND gates 229 and 231 on line 61 from buffer 59 is a logic low. NAND gate 229 has a high and low input, while NAND gate 231 has two low inputs. For these input conditions, both gates have a logic high output. The output of gate 229 is supplied on line 259 to the set input of flip-flop 241 and the output of gate 231 is supplied on line 253 to the reset input of flip-flop 241. Since the logic level supplied to either the set or reset input of flip-flop 241 is inverted at the respective inputs, the logic highs supplied by gates 229 and 231 to flip-flop 241 become logic lows at the set and reset inputs, which results in flip-flop 241 maintaining its prior status, i.e., a logic high output on line 255 and a logic low output on line 257. For the flip-flop 241 outputs as noted and with a first signal element at the input to gate 225, the inputs to NAND gates 233 and 235 are high and low, so that each gate supplies a high output on line 261 to the set input of flip-flop 243. Meanwhile, the inputs to NAND gate 237 are both low making its output high, while the inputs to NAND gate 239 are both high making its output low. The output of these latter gates is supplied on line 263 to the reset input of flip-flop 243. The low output of NAND gate 239 is inverted and becomes a high at the reset input of flip-flop 243 resetting or keeping flip-flop 243 reset.

With flip-flop 243 reset, its output on line 47 to the input of gate 221 of counter input 43 is low, while its output on line 49 to the input of gate 223 is high. With the input to gate 221 low the output of gate 221 remains high in response to the inputs supplied to counter input 43 from signal multiplier 39. However, with the input to gate 223 from counter control 45 high, gate 223 will pass the two signal elements supplied to counter input 43 from signal multiplier 39, which signal elements are thus supplied on line 55 to the downcount input of counter 51 to down count the value of the contents of counter 51 from its negative initial value toward zero.

When the value of the contents of counter 51 reach zero in the present example, the logic level of the input supplied to counter control 45 on line 61 becomes high.

The inputs to NAND gate 229 are both high, making the output of gate 229 on line 259 to the set input of flip-flop 241 low. This logic level is converted to a high at the set input of flip-flop 241 and sets the flip-flop. This makes the output of flip-flop 241 on line 255 now low and its output on line 257 now high. This, in turn, results in both inputs to NAND gate 233 being high making the output of gate 233 on line 261 to the set input of flip-flop, 243 low. This logic level is inverted to a logic high at the set input of flip-flop 243 and sets the flip-flop, making its output on line 47 high and its output on line 49 low. With the input on line 47 to NAND gate 221 of counter input 43 high, gate 221 will pass the two signal elements supplied to counter input 43 from signal multiplier 39 and gate 223 now will not. The signal elements from signal multiplier 39 are now supplied on line 53 to the up-count input of counter 51 to up count the value of the contents of counter 51 from zero to a positive value.

When flip-flop 241 is set, the input of inverter 245 changes from high to low and its output from low to high, while the input of inverter 247 changes from low to high and its output from high to low. The output of either inverter can be supplied on line 63 from counter control 45 to buffer 59 to provide a sign indication for use in comparator 67 which denotes the value of the contents of counter 51 supplied thereto. Counter control 45 thus acts as a zero detector to determine which side of zero the value of the contents of counter 51 is on and when the zero value is reached. It then provides an indication of reaching zero both to counter input 43 and to comparator 67 (through buffer 59). Further, counter control 45 can change the input to counter 51 depending on which signal element is supplied by logic unit 29 that counter control 45 is also responsive to changes in direction of the movement of balance beam 3 regardless of which side of zero the value of the contents of counter 51 is on.

Counter 51 is a three decade counter comprised of a hundredths decade counting section 265 a tenths decade counting section 267, and a units decade counting section 269. The digital value within each section is comprised of four binary bits. Binary bits are loaded into each section of counter 51 at the start of a weighing operation via reset pushbutton 82 and also when counter preset control 111 supplies preset command indicating of balance beam 3 attaining is intermediate position. The bits loaded into the respecting sections of control 51 are supplied to the counter on lines 115A through 115L. Since in the present example the initial value of the contents of counter 51 is −5.00 and the preset value is −1.00, a binary bit representing the digit 1 is hard wired into units decade counting section 269 via line 115L, and a binary bit representing the digit 4 is supplied to this section through reset switch 82.

The second signal conditioner 107 of control unit 25 is comprised of inverters 271 and 273 and an input filter capacitor 275. The output of the optical sensing unit 91, shown in FIG. 1, is a logic low until the tab 101 affixed to the underside of balance beam 3 blocks the passage of light between light source 95 and light detector 97, which is a phototransistor. When light blockage occurs, the output of sensing unit 91 on line 105 goes from a logic low to a logic high. Inverter 271 performs a first inversion of this logic level transition and inverter 273, whose input is supplied by the output of inverter 271, performs a second. The output of inverter 273 is supplied on line 109 to the input of counter preset control 111.

Counter preset control 111 is comprised of a oneshot multivibrator 277 which operates in the same manner as the other multivibrators in control unit 25, NAND gates 279 and 281, and an inverter 283. The output of multivibrator 277 on line 285 is normally a logic low, while its output on line 287 is normally a logic high. The output of multivibrator 277 on line 287 is supplied to one input of NAND gate 281. The other input to NAND gate 281 is supplied on line 253 and is normally a logic high. With both inputs to NAND gate 281 normally high its output is low and this is inverted by inverter 283 to a logic high which is supplied on line 113 to the load input of counter 51 decade sections 265, 267 and 269.

At the start of a weighing operation when reset pushbutton 82 on panel 73 is depressed, the input to NAND gate 281 on line 253 is momentarily made a logic low and the output of gate 281 goes from a logic low to a logic high. This logic level is inverted by inverter 283 to a logic low which is supplied on line 113 to the counter 51 load inputs. When the input on line 253 to gate 281 goes low, this results in a transition at the load inputs of sections 265, 267 and 269 from a logic high to a logic low and this transition actuates the load input circuitry in each counter section to set the value of the contents of each section to the value represented by the inputs on lines 115A through 115D for the hundredths value, the value represented by the inputs on lines 115G through 115H for the tenths value, and to the value represented by inputs on lines 115I through 115L for the units value. In the present example, this means that binary bits for 4 and 1 are loaded into section 269 on lines 115J and 115L respectively with no bit being present on any other line. This sets the value of the contents of counter 51 to the initial value of −5.00.

When balance beam 3 attains its intermediate position so that the output of sensing unit 91 on line 105 goes from a logic low to a logic high, this transition is provided on line 109 through signal conditioner 107 to the input of multivibrator 277. The sensing by multivibrator 277 of this transition triggers multivibrator 277 and its output on line 285 goes from a logic low to a logic high while its output on line 287 goes from a logic high to a logic low. Because multivibrator 277 performs as do the other multivibrators in control unit 25, the change in each multivibrator 277 output from its normal logic level lasts only a short period (e.g. 20 microseconds). The output of multivibrator 277 on line 287 to the input of NAND gate 281 causes gate 281 to perform in a manner similar to that which occurs when reset pushbutton 82 is depressed. Thus when the output of multivibrator 277 on line 287 changes from a logic high to logic low, the result is a transition at the load input of each counter 51 decade section 265, 267 and 269 from a logic low to a logic high. A binary bit for the value 1 is loaded into section 269 from line 115L, while binary bits for the amount of tare compensation required to offset bucket 7 buildup are loaded into section 265 from lines 115A through 115D and into section 267 from lines 115E through 115H.

The output of NAND gate 279 is normally a logic high. This logic level is supplied on line 253 to the reset input of flip-flop 241 of counter control 45. When multivibrator 277 responds to the input on line 109 from sensing unit 91 both inputs to NAND gate 279 go from a logic low to a logic high. The output of NAND gate 279 goes low when this occurs and this low logic level is inverted at the reset input to flip-flop 241 to a logic high, resetting flip-flop 241. This insures that the output of counter control 45 on line 63 is of the logic level required to have the value of the counter 51 contents interpreted as a minus value.

The binary bits representing the value of the counter 51 contents are supplied on lines 57B through 57L to buffer 59. Line 57A, which corresponds to 0.01 is grounded so as to always provide a logic low input to Buffer 59. Each input to buffer 59 except that on line 57A is supplied to two sets of inverters 289A through 289L and 291A through 291L. The input to inverter 289A is the logic low input on line 57A, while the input to inverter 291A is the sign input from counter control 45 on line 63. The outputs of inverters 289A through 289L are commonly connected to provide the output supplied on line 61 to counter control 45. This is the logic level derived from the value of the contents of counter 51. So long as the value of the contents of counter 51 are less than zero, at least one input to buffer 59 on lines 57A through 57L is a logic high which is inverted by the appropriate inverter of 289A through 289L to a logic low thus making the output supplied on line 61 a logic low. However, when the value of the contents of counter 51 reaches zero, all the inputs to buffer 59 on lines 57A through 57L are low and their outputs are converted by inverters 289A through 289L to logic highs. Because the outputs of all inverters 289A through 289L are now high the output level on line 61 supplied to counter control 45 is a logic high.

The outputs of the second set of inverters 291A through 291L are supplied on lines 65A through 65L to comparator 67 of control unit 25 and to printer 69 and optical display 71 as noted, the input to inverter 291A is the output supplied on line 63 from counter control 45 which output is used by comparator 67 to determine whether the value of the contents supplied by counter 51 is a positive or negative value.

Figure 3:
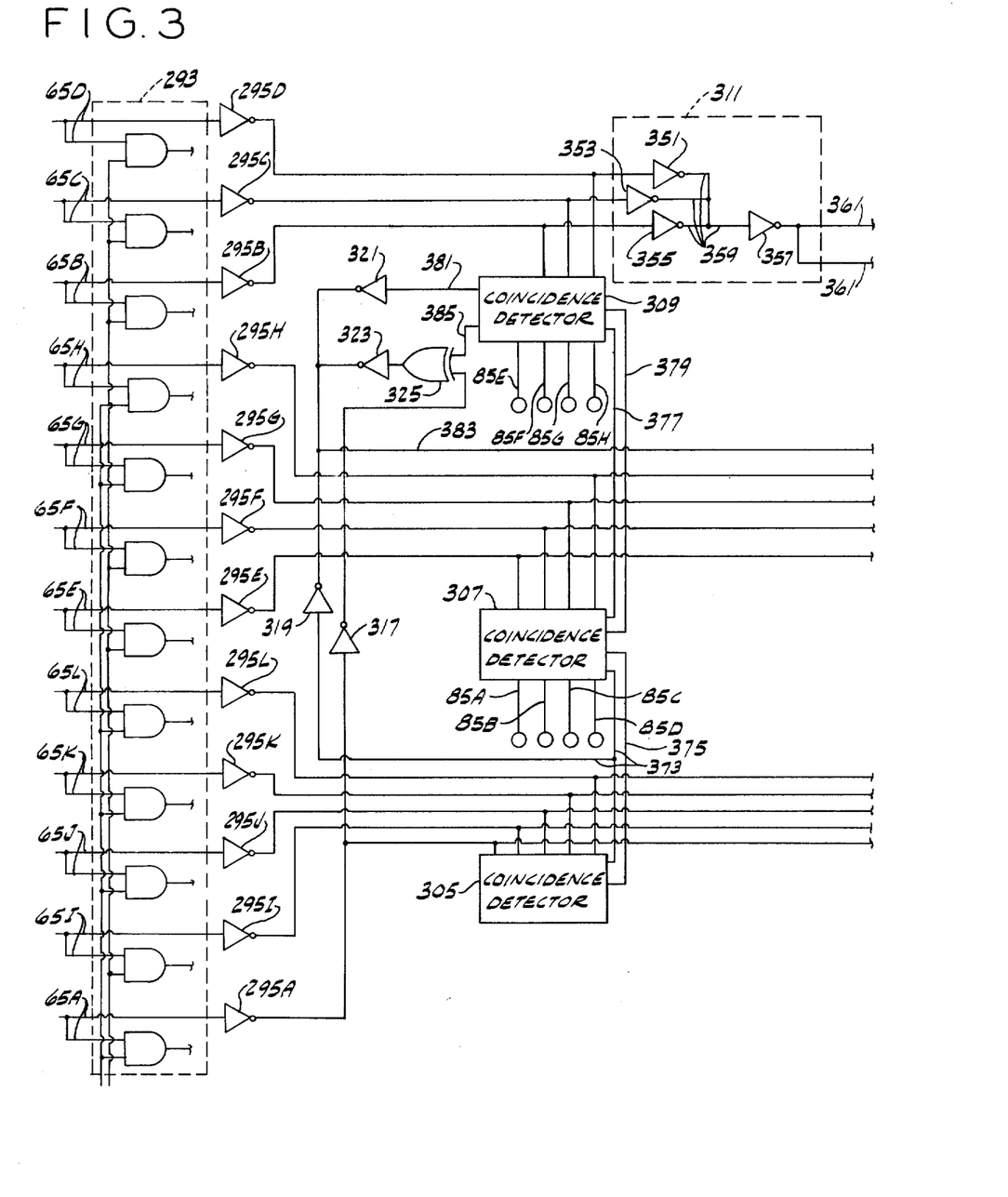
Figure 3A:
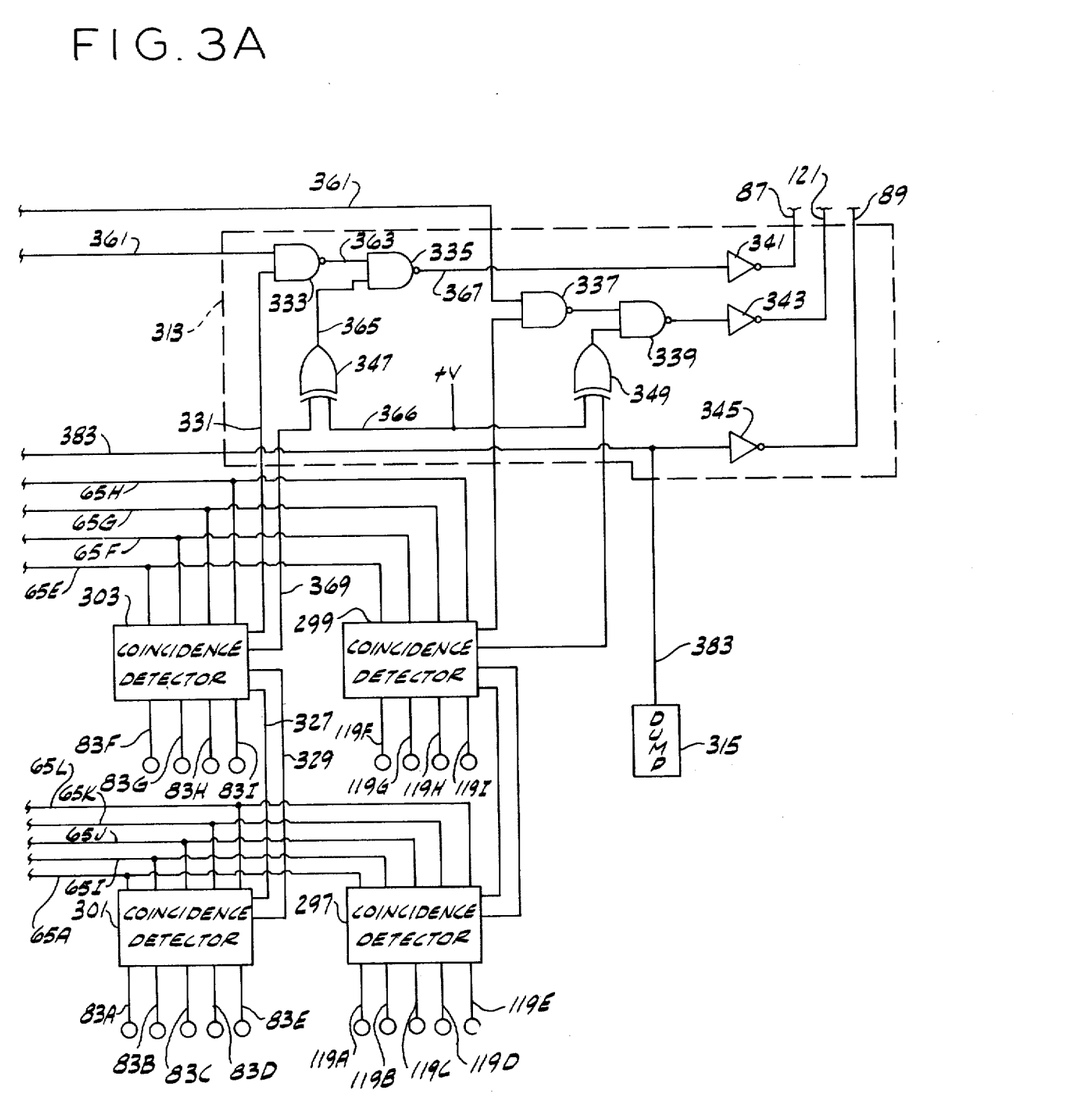

Referring now to FIGS. 3 and 3A, comparator 67 is shown in more detail as comprised of a data multiplexer 293, a plurality of input buffer gates 295A through 295L coincidence detectors 297, 299, 301, 303, 305, 307 and 309 which are conventional comparator circuits each capable of comparing two sets of weighted information each up to five bits long, a zero detector circuit 311, an accessory, bulk and dribble control circuit 313, and a dump control circuit 315.

Coincidence detectors 297 and 299 are used in conjunction with zero detector 311 to control the accessory function. Coincidence detector 297 compares the unit value of the preselected count with the value of the counter 51 contents, while coincidence detector 299 compares the tenths value. Binary bits representing the accessory preselected count value are loaded into coincidence detector 297 on lines 119A through 119E and into coincidence detector 299 on lines 119F through 119I.

Coincidence detectors 301 and 303 are used in conjunction with zero detector 311 to terminate bulk feed. Coincidence detector 301 compares the unit value of the preselected count with the value of the counter 51 contents while coincidence detector 303 compares the tenths value. Binary bits representing the bulk feed cutoff preselected count are loaded into coincidence detector 301 on lines 83A through 83E and into coincidence detector on lines 83F through 83I.

Coincidence detectors 305, 307 and 309 together with inverters 317, 319, 321 and 323 and Exclusive Or gate 325 control termination of the dribble feed. Coincidence detector 305 compares the unit value of the preselected count with the unit value of the counter 51 contents, while coincidence detector 307 compares the tenths value and coincidence detector 309 the hundredths value. Because the unit value for dribble feed cutoff is always zero the value preloaded into coincidence detector 305 is zero. Binary bits representing the tenths value of the preselected count are loaded into coincidence detector 307 on lines 85A through 85D and into coincidence detector 309 on lines 85E through 85H.

The operation of coincidence detectors 297 and 299 for the accessory function is identical with that of coincidence detectors 301 and 303 for the bulk feed cutoff. Thus, in the present example, the value −2 is loaded into units coincidence detector 301 and the value zero into tenths coincidence detector 303. The binary bits supplied to coincidence detector 301 on lines 65I through 65L plus the sign bit supplied on line 65A are compared with the sign and value bits entered into it on lines 83A through 83E. When these values are equal, the output logic levels of coincidence detector 301 on lines 327 and 329 are both low. These levels are supplied as inputs to coincidence detector 303. When this condition exists, and when the value the hundredths digits entered into coincidence detector 303 on lines 85F through 85I equals the value of the bits supplied to the detector on lines 65E through 65H, the output of coincidence detector 303 on line 331 goes from a logic low to a logic high and this logic level is supplied to control circuit 313.

Control circuit 313 is comprised of NAND gates 333, 335, 337 and 339, inverters 341, 343 and 345 and Exclusive Or gates 347 and 349. Gates 333, 335, and 347, and inverter 341 form the bulk feed cutoff control, while gates 337, 339, and 349 and inverter 343 form the accessory function control. Both circuits operate in a similar manner.

Zero detector 311 is comprised of inverters 351, 353, 355 and 357. The input to inverter 351 is supplied from counter 51 on line 65D, while the input to inverter 353 is supplied on line 65C, and the input to inverter 353 is supplied on line 65B. The output of inverters 351, 353 and 355 are commonly supplied on line 359 to the input of inverter 357 and the output of inverter 357 is supplied on line 361 to one input of NAND gates 333 and 337. So long as any of the bits comprising the hundredths digit of the counter 51 value are high (indicating that the value of the hundredths digit in counter 51 is 2, 4, 6, or 8) at least one input to zero detector 311 is high, and the resultant output of inverter 357 on line 361 is a logic high. Only when all the inputs to zero detector 311 are low (indicating that of value of the hundredths digit in counter 51 is zero) is the output of inverter 357 a logic low.

Referring again to the input to control circuit 313 on line 331 it is, as noted, a logic high when the units and tenths digits of the counter 51 output equal the preselected count value. So long as the hundredths digit of the counter 51 contents is not zero both inputs to gate 333 are a logic high making the output of gate 333 on line 363 to one input of gate 335 a logic low. With a logic low input to gate 335, its output on line 367 is a logic high which level is inverted by inverter 341 to a logic low. This logic level is supplied on line 87 to vibratory unit 15 which operates bulk feeder 11. With the logic level on line 87 low, bulk feed will continue. When, however, the value of the hundredths digit in counter 51 becomes zero, the output of zero detector 311 on line 361 becomes a logic low. Gate 333 now has a high and a low input making its output a logic high on line 363. The input to Exclusive Or gate 347 on line 369 is a logic low, making the output of gate 347 on line 365 high because the other input supplied to gate 347 on line 366 is a logic high. Both inputs to gate 335 now being high, its output becomes a logic low which is inverted by inverter 341 to a logic high. This logic high is supplied on line 87 to vibratory unit 15 to stop its operation and terminate bulk feed.

After the units and tenths digit values of the counter 51 contents no longer equal the preselected count value, but are greater, the output of comparator 303 on line 331 goes low and remains low so that gate 333 has one input always a logic low. This makes the output of gate 333 a continuous logic high to one input of gate 335. The output of comparator 303 on line 369 remains low so that the output of gate 347 remains high. Thus, both inputs to gate 335 are a logic high keeping the gate 335 output low, which is the condition necessary to keep bulk feed cutoff.

The dribble feed comparator has a range of zero plus or minus 0.98 ounces. In this present example, the dribble feed cutoff value has been set to −0.50 ounces, one-half ounce representing the amount of product in suspension between dribble feeder 13 and bucket 7 when dribble feed is terminated. Coincidence detectors 305, 307 and 309 perform in a similar manner to those associated with the accessory and bulk feed functions. When the unit value of the counter 51 contents is zero, the outputs of coincidence detector 305 on lines 373 and 375 are low, the output on line 373 being low as long as the value of the counter 51 contents is zero or a negative value. The output of coincidence detector 305 on line 373 is supplied to the input of inverter 319 and the output of inverter 319 is a logic high until the contents of counter 51 attain a positive value. When the value of the tenths digit of the counter 51 contents equals the preselected value set into coincidence detector 307 on lines 85A through 85D, its output on lines 377 and 379 are both low. Finally, when the value of the hundredths digit of the counter 51 contents equals the preselected value set into coincidence detector 309 on lines 85E through 85H, its output on line 381 goes from logic low to a logic high. This makes the output of inverter 321 a logic low.

When the output of any inverter 319, 321 or 323 becomes a logic low, it makes the input on line 383 to inverter 345 a logic low. Inverter 345 inverts this logic low to a logic high which is supplied on line 89 to stop the operation of vibratory unit 17 and terminate dribble feed. Thus, in the present example, when the contents of counter 51 reaches this value −0.50 dribble feed is terminated because the output of inverter 321 is a logic low.

Product, however, is still falling into bucket 7 on balance beam 3 and the value of the contents of counter 51 continues being down counted toward zero. After the contents of counter 51 are no longer −0.50, but are, for example, −0.48, the output of coincidence detector 309 on line 381 returns to a logic low and the output of inverter 321 becomes a logic high. Dribble feed is kept cut off, however, because as long as the value of the counter 51 contents is less than or equal to the preselected count value, which in this example is zero, the output of coincidence detector 309 on line 385 is a logic low. This output is one input to Exclusive Or gate 325. The other input to gate 325 is the output of inverter 317 which is controlled by the sign bit supplied on line 65A and is a logic low if the value of the counter 51 contents is less than zero. Thus, until the value of the counter 51 contents exceeds −0.50, gate 325 has two low inputs and a resultant low output. The low output of gate 325 is inverted by inverter 323 to a logic high. When the value of the counter 51 contents becomes −0.48, the output of coincidence detector 309 on line 385 becomes a logic high. Gate 325 now has a low and a high input, and its output to inverter 323 becomes a logic high. This logic high output is inverted by inverter 323 to a logic low which inverter 345 inverts to a logic high thus keeping dribble feed cut off.

If the value of the counter 51 contents exceeds zero and becomes a positive value the output of inverter 317 changes from a logic low to a logic high thus making both inputs to gate 325 high. Because gate 325 is an Exclusive Or gate, its output goes low and the output of inverter 323 becomes a logic high. However, the output of coincidence detector 305 on line 373 changes from a logic low to a logic high when the value of the counter 51 contents exceeds zero and the input to inverter 319 now becomes a logic high. This logic level is inverted by inverter 319 to a logic low to keep dribble feed cut off.

The input to inverter 345 on line 383 is also supplied to dump circuit 315. Dump circuit 315 operates in conjunction with a cyclic control system such as that disclosed in U.S. Pat. No. 3,856,097 to dump the contents of bucket 7 at the end of some period which is set to occur after dribble feed has terminated and balance beam 7 has attained its balance position. After a dump, balance beam 3 returns to its initial position 3' and another weighing operation is commenced.

It is to be understood that a plurality of weighing control systems such as the one described above can be operated simultaneously and that for this purpose control and display panel 73 may include a data sslector control for monitoring the output of the counter 51 of any one system at a given time. It is for this purpose that the data multiplexer 293, shown in FIG. 3, is incorporated into comparator 67. Further, it is to be understood that the contents of counter 51 may be provided to either printer 69 or optical display 71 instead of to both simultaneously as described above and this may. be accomplished by properly designing control and display panel 73.

In view of the above, it will be seen that the several objects of the invention are achieved and other advantageous results obtained.

As various changes could be made in the above constructions without departing from the scope of the invention, it is intended that all matter contained in the above description shall be interpreted as illustrative and not in a limiting sense.

What is claimed is:
1. Apparatus for feeding a product to a weighing scale and stopping the feed when the amount of product fed reaches a final weight comprising:
   a scale having balance means, adapted to receive product to be weighed and movable from an initial position toward a balance position as product is delivered thereto, said balance means starting to move upon delivery thereto of a predetermined initial weight of product;
   first and second product feed means activated at the start of a weighing operation for delivering a quantity of product from a source thereof to the balance means, the first means delivering product at a first rate of speed and the second means delivering product at a second and slower rate of speed;
   means for sensing movement of the balance means in either of two directions and for providing first and second electrical outputs representative of the magnitude and direction of movement thereof, each output always having one of two discrete states; and control means responsive to the sensing means outputs for terminating operation of the first product feed means when the amount of product delivered to the balance means reaches a first predetermined level and for terminating operation of the second product feed means when the amount of product delivered to the balance means reaches a second predetermined level substantially equal to the final weight of product to be delivered, whereby the amount of product delivered to the balance means after termination of operation of the second product feed means will bring the balance means into its balance position indicating that the final weight of product to be delivered has been attained.

2. Apparatus as set forth in claim 1 further including means responsive to the control means for preventing further delivery of product by the first product feed means upon termination of the operation thereof.

3. Apparatus as set forth in claim 1 wherein the control means further includes means for dumping the product delivered to the balance means after the final weight of product to be delivered thereto has been attained.

4. Apparatus as set forth in claim 1 wherein the sensing means includes means coupled to the balance means and actuated by the movement thereof from its initial position for alternately supplying the first and second discrete states of the first electrical output in a first sequence and for alternately supplying the first and second discrete states of the second electrical output in a second sequence, the first sequence being shifted in phase with respect to the second sequence and the phase relationship between the first and second electrical outputs being a function of the direction of balance means movement.

5. Apparatus as set forth in claim 4 wherein the means coupled to the balance means is a shaft encoder capable of sensing increments of movement of the balance means and the direction of occurrence thereof.

6. Apparatus as set forth in claim 1 wherein the control means includes logic means responsive to the first and second electrical outputs of the sensing means to provide a first signal representative of the distance the balance means moves in a first direction and to provide a second signal representative of the distance the balance means moves in a second direction.

7. Apparatus as set forth in claim 6 wherein the logic means responsive to the first and second electrical outputs of the sensing means includes means for sensing the transition of either electrical output between one discrete state thereof and the other discrete state thereof, for determining the direction of the transition between discrete states, for comparing the direction of transition between discrete states of the one electrical output with the discrete state of the other electrical output at the time of the transition, and for supplying one element of the first signal when the direction of transition between discrete states of the one electrical output compared with the discrete state of the other electrical output indicates that the balance means has moved an incremental distance in the first direction, and for supplying one element of the second signal when the direction of transition between discrete states of the one electrical output compared with the discrete state of the other electrical output indicates that the balance means has moved an incremental distance in the second direction, whereby in any sequence of transitions of both electrical outputs of the sensing means from one discrete state to the other discrete state and back to the original discrete state thereof, four signal elements are supplied by the logic means.

8. Apparatus as set forth in claim 7 further including a reversible presettable counter adapted to count from a first predetermined value representative of the initial weight of product delivered to the balance means to and past a second predetermined value representative of the final weight of product to be delivered to the balance means, the counter being responsive to the first and second signals from the logic means to increment and decrement the counter contents.

9. Apparatus as set forth in claim 8 further including means for providing a visual indication of the counter contents.

10. Apparatus as set forth in claim 8 further including means for providing a digital printout of the counter contents.

11. Apparatus as set forth in claim 8 further including a signal multiplier responsive to each signal element supplied by the logic means for doubling the repetition rate thereof.

12. Apparatus as set forth in claim 6 further including a counter control responsive to each signal supplied by the logic means and a logic level derived from the counter contents for supplying the output of the signal multiplier to one of two inputs to the counter for incrementing and decrementing the contents thereof, the counter input to which the output of the signal multiplier is supplied being dependent upon which signal is supplied by the logic means to the counter control and whether the logic level derived from the counter contents indicates that the value thereof has reached the second predetermined value.

13. Apparatus as set forth in claim 8 further including means for sensing during each weighing operation when the balance means has moved to a position intermediate its initial and its balance positions and for then supplying a command to the counter to preset the value of the contents thereof thereby to eliminate counting errors.

14. Apparatus as set forth in claim 13 wherein the last said sensing means is an optical sensor.

15. Apparatus as set forth in claim 13 further including means actuated by the preset command supplied to the counter to adjust the value of the contents thereof to compensate for any weight added to the balance means during prior weighing operations thereby to eliminate weighing inaccuracies caused by adherence to the balance means of any product delivered thereto.

16. Apparatus as set forth in claim 8 further including first means for comparing the counter contents with a first preselected count and second means for comparing the counter contents with a second preselected count, the output of the first comparison means terminating operation of the first product feed means whenever the counter contents equal the first preselected count, and the output of the second comparison means terminating operation of the second product feed means whenever the counter contents equal the second preselected count.

17. Apparatus as set forth in claim 16 further including third means for comparing the counter contents with a third preselected count, the output of the third comparison means operating means to prevent further delivery of product by the first product feed means whenever the counter contents equal the third preselected count.

18. Apparatus as set forth in claim 17 further including means for setting the first preselected count into the first comparison means, for setting the second preselected count into the second comparison means, and for setting the third preselected count into the third comparison means.

* * * * *